March 12, 1957 W. C. OVERTON, JR 2,784,796
SHEAR MODULUS ACOUSTIC WELL LOGGING
Filed Jan. 25, 1952 3 Sheets-Sheet 1
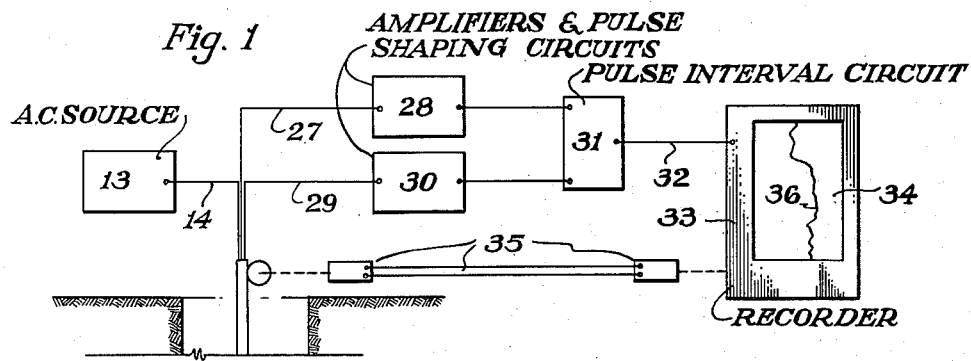
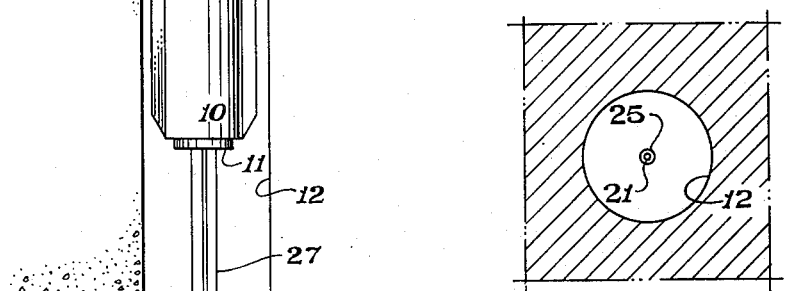
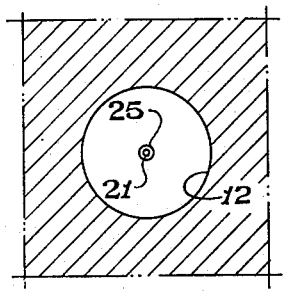
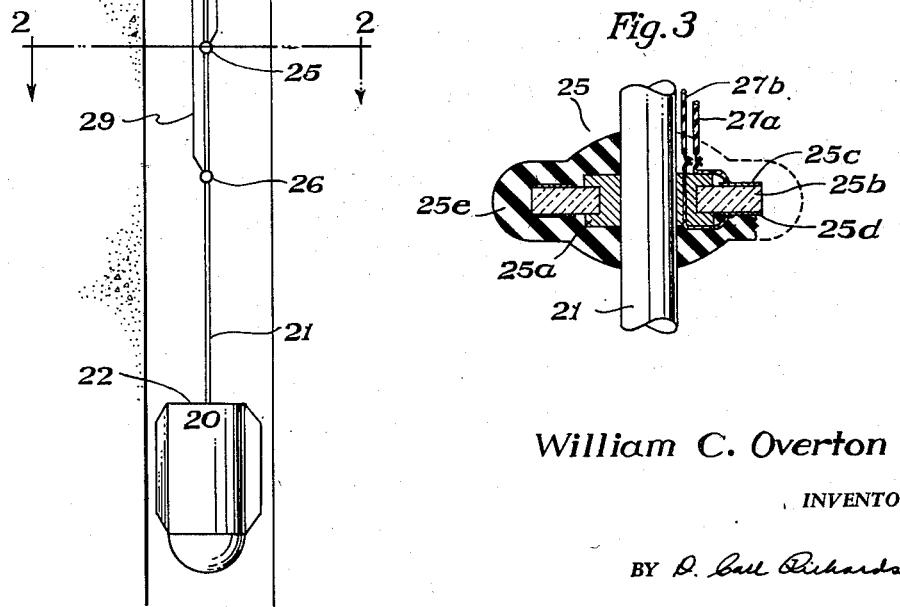
William C. Overton Jr.
INVENTOR.
BY
AGENT

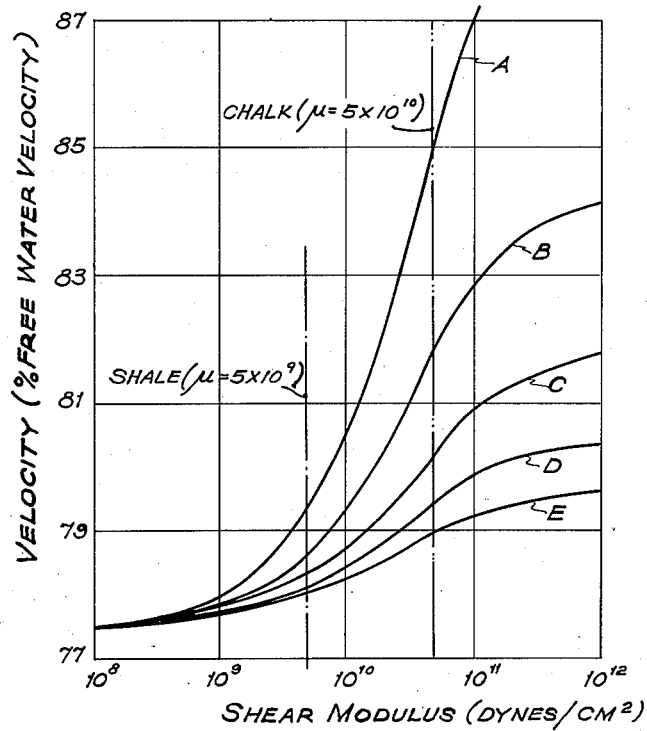
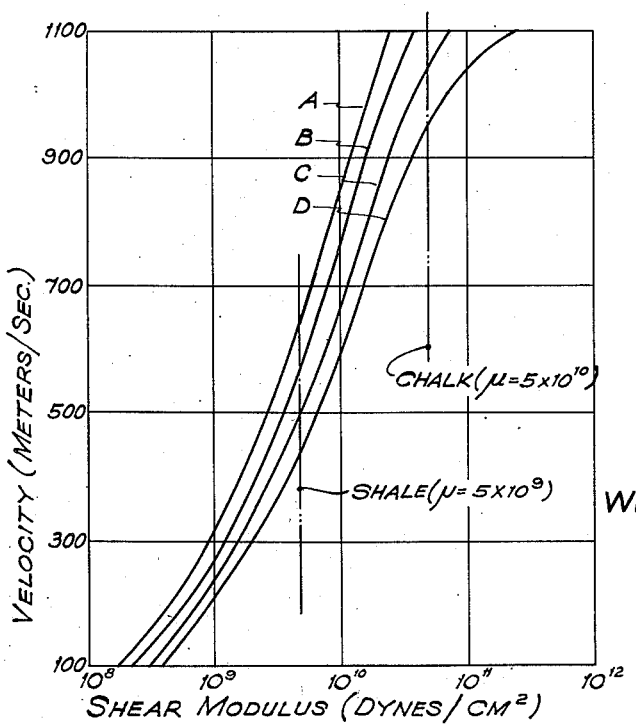

March 12, 1957  W. C. OVERTON, JR  2,784,796
SHEAR MODULUS ACOUSTIC WELL LOGGING
Filed Jan. 25, 1952  3 Sheets-Sheet 3

William C. Overton Jr.
INVENTOR.

BY O. Carl Richards
AGENT

United States Patent Office 2,784,796
Patented Mar. 12, 1957

2,784,796

SHEAR MODULUS ACOUSTIC WELL LOGGING

William C. Overton, Jr., Washington, D. C., assignor, by mesne assignments, to Socony Mobil Oil Company, Inc., a corporation of New York Application January 25, 1952, Serial No. 268,227

10 Claims. (Cl. 181—.5)

This invention relates to acoustic well logging and more particularly to the measurement in situ of the shear modulus of formations penetrated by a bore hole.

The shear modulus of rocks is an elastic constant describing resistance to yield to a given shearing stress in which the stress is of such a nature that it produces no change in the volume of the rock. The shear modulus is a parameter closely related to the porosity, the static pressure due to the overburden, the chemical properties of formations, the cementation structure, and the fluid occupying the pores. When sub-surface rocks are brought to the surface as in the study of core samples from well bores, the enormous pressures effective in-place are released and the characteristics of the sample become changed.

An accurate log of variations in the shear modulus of formations adjacent a bore hole aids in an understanding of the possible fluid content as may be productive of petroleum and is also useful in describing or understanding the propagation of waves as used in seismic exploration for structures possibly containing petroleum in producing quantities.

It may be shown that sound waves produced in a liquid filled bore hole having a wave length very much greater than the circumference of the bore hole travel up or down hole through the bore hole liquid with a velocity depending upon the velocity that sound would travel in an infinite body of the liquid and in dependence upon the shear modulus of the formations of the material surrounding the bore hole.

In accordance with the present invention variations in the shear modulus of formations adjacent a liquid filled well bore are measured by generating a low frequency sinusoidal wave having a wave length in the bore hole liquid much longer than the circumference of the bore hole and at a point spaced from the point of generation reflecting the low frequency sinusoidal wave to establish large amplitude standing waves in said bore hole fluid. The sinusodial wave is then detected at points intermediate the point of generation and the point of reflection and the time separation between the signals thus detected is measured. The separation, inversely proportional to velocity of sound in the bore hole liquid, is dependent upon the shear modulus of formations adjacent said region.

In a more specific aspect of the invention there is provided a sound generator adapted for generating a low frequency sinusoidal wave which because of the ratio of wave length to bore hole circumference travels as a compressional wave principally in the fluid in the bore hole. A reflecting surface is positioned a predetermined distance from the generator to reflect the wave and establish standing waves between the generator and the reflector. A pair of detectors spaced a preselected distance apart and between the generator and reflector detect the wave. Variations in the phase angle between the signals detected are then plotted as a function of bore hole depth, the variations being dependent upon variations in the sheer modulus of the adjacent formations.

For a further understanding of the present invention, reference may now be had to the following description taken in conjunction with the accompanying drawings in which:

Fig. 1 schematically illustrates a shear modulus logging system;

Fig. 2 is a sectional view taken along lines 2—2 of Fig. 1;

Fig. 3 is a sectional view of the detector 25;

Fig. 4 is a graph of velocity of sound in the bore hole fluid as a function of formation shear modulus for bore hole fluids of different characteristics;

Fig. 8 is a graph of velocity of sound in the fluid in tube 40, Fig. 5, as a function of formation shear modulus illustrating the variation of the velocity in the fluid container in the tube due to variations in the bore hole diameter.

Figure 5:
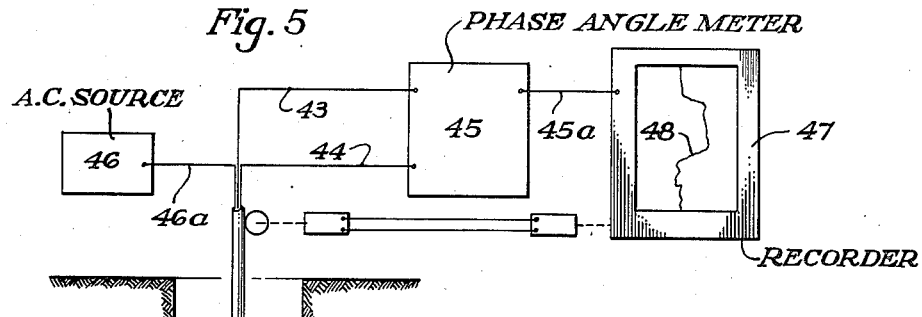
Fig. 5 is a modification of the invention.

Acoustic logging methods known in the prior art in general are characterized by a dependence upon transmission of acoustic energy through formations adjacent the bore hole. This is true of both velocity logging methods and transmission logging methods. In the prior art, efforts have been directed toward assuring sound travel between a transmitter and a receiver along a path principally through the formations. It has been an object in the prior art to eliminate transmission between transmitter and receiver by way of the liquid in the bore hole.

In accordance with the present invention, and in contrast to prior art systems which depend upon transmission through earth sections adjacent a bore hole, applicant measures the velocity of sound traveling by way of the path comprised of the bore hole liquids. It has been determined that the velocity of low frequency sound in the bore hole liquid under conditions as will hereinafter be described has the following relationship:

$$v = v_0 \sqrt{\frac{\mu}{\mu + k_0}} \quad (1)$$

where $v$=velocity of sound measured in the fluid in the bore hole; $v_0$=velocity sound would have in an infinite body of the bore hole fluid; $\mu$=the shear modulus of formations adjacent the bore hole; and $k_0$=the bulk modulus of the fluid in the bore hole.

In order for Equation 1 to be valid in the logging art, the frequency of the signals must be in the low audio range, preferably not higher than 200 cycles per second.

Acoustic energy in this frequency range travels through the liquid in the bore hole in such a manner that its tendency to expand the walls of the bore hole in proportion to the pressure at any point in the liquid is opposed by the formations themselves. The pressure exerted by the acoustic wave in the bore hole liquid against the cylindrical wall of the bore hole causes radial acoustic displacements of the formations producing in the formations stresses tending to restore the bore hole wall to the equilibrium position, said stresses being controlled principally by the shear modulus of the formations and reacting back against the acoustic wave in the liquid so as to modify its velocity. The shear modulus of the formations thus modifies the velocity of travel of the acoustic wave through the bore hole liquid, reducing the velocity to a value somewhat less than the velocity of a wave of the same frequency through an infinite unbounded body of liquid having the same properties as the liquid in the bore hole.

A system for producing a log of the shear modulus of formations adjacent a liquid filled bore hole is illustrated in Fig. 1. A first element 10 including a sound source 11 is suspended by a cable 10a as to be movable throughout the length of the bore hole 12. A source of low frequency signals 13 is connected by way of a signal channel 14 in cable 10a to the source 11 to generate low frequency sinusoidal waves which travel downwardly through the bore hole liquid. As above noted, the frequency of the signals is low so that the wave length of the sound wave is very much greater than the circumference of the bore hole 12.

A second member 20 is supported and spaced from the element 10 by a coupling rod 21, the spacing between the elements 10 and 20 being a selected portion of a wave length which in general will be not less than about ten bore hole diameters. The upper face 22 of the element 20 presents a reflecting surface to the downwardly traveling waves generated by the source 11 so that standing waves are produced between elements 10 and 20. A pair of detectors 25 and 26 are supported, as from the rod 21, a pre-selected distance apart in the region intermediate elements 10 and 20. The detector 25 is connected by way of channel 27 to an amplifier and pulse shaping circuit 28. Similarly, the detector 26 is connected by way of channel 29 to an amplifying and pulse shaping circuit 30, the latter being identical in construction and operation with circuit 28.

The input signals appearing on channels 27 and 29 are low frequency sinusoidal voltages having a phase angle therebetween proportional to the velocity of sound in the liquid between elements 10 and 20. Circuits 28 and 30 preferably amplify and shape the signals on channels 27 and 29, respectively. The voltages are squared and a single voltage pulse per cycle is derived from each signal at the same relative point in each cycle. The voltage pulses from circuits 28 and 30 are applied to a comparison circuit 31 which produces a voltage appearing on its output channel 32 proportional to the time interval between the pulses from circuits 28 and 30. The latter voltage is applied to a suitable recording device such as a chart recorder 33 having a chart 34 driven in proportion to movement of cable 10a. The chart driving means comprises a suitable electromechanical coupling, such as the system 35, which includes a selsyn transmitter driven in proportion to movement of cable 10a and connected by way of a pair of conductors to a selsyn receiver which controls movement of the chart 34 as the exploring unit, including elements 10 and 20, is moved along the bore hole 12. Thus the length of the chart on recorder 33 is proportional to bore hole depth and variations in the position of the trace 36 on the chart 34 are inversely proportional to or dependent upon the variations in velocity of sound in the bore hole liquid. The latter variations are dependent upon shear modulus of the adjacent formations as shown by Equation 1.

In Fig. 2 there is illustrated a cross-sectional view through the bore hole and the instrument taken along the lines 2—2 of Fig. 1. The connecting rod 21 is centrally located in the bore hole, the bore hole itself being uncased so that bore hole fluids contact the formations which exert a modifying effect on the travel of sound in the bore hole fluid.

In Fig. 3 there is illustrated a cross-sectional view of detector 25 of Fig. 1. An insulating spool 25a is rigidly secured to and supported by the rod 21. A piezoelectric element 25b, in the form of an apertured disc or washer, is supported by the spool 25a. A pair of contacting electrodes 25c and 25d are carried by opposite faces of the element 25b. A pair of conductors 27a and 27b are electrically connected to the electrodes 25c and 25d. A rubber sheath 25e moulded around the above described structure completely insulates the piezoelectric element from fluids in the bore hole. Variations in pressure exerted through the sheath 25e onto the element 25b produce voltages which appear between electrodes 25c and 25d which are transmitted by way of channel 27 (conductors 27a and 27b) to the amplifier 28, Fig. 1. The second detector 26 preferably is identical in construction and operation to that of detector 25. Voltages generated by detector 26 are transmitted by way of channel 29 to the amplifier and pulse shaping circuit 30. Since the detectors 25 and 26 and the signal channels 27 and 29 are identical in all respects and are subject to the same conditions in the course of their operations, the signals applied to the circuits 28 and 30 are truly representative of the acoustic phenomena in the bore hole and are substantially independent of variations that may be introduced by reason of variations in such physical properties as temperature and pressure in the bore hole.

In carrying out the present invention it would be desirable to have the physical properties of the liquid in the bore hole remain constant from top to bottom. This is apparent from an inspection of Equation 1 which indicates that the velocity of sound in the bore hole fluid is dependent upon the bulk modulus $k_0$ and upon the velocity $v_0$ sound would have in an infinite unbounded body of the liquid. If the suspended particles, such as are ordinarily utilized in drilling fluids to give weight and consistency, settle to the bottom of the bore hole during the logging operation, the velocity as sensed by the system of Fig. 1 will vary not with the shear modulus only but in an unpredictable manner in dependence upon the degree of settling.

In Fig. 4 variations in the shear modulus of the formations adjacent the bore hole are plotted as a function of velocity ($v$) measured in the bore hole. The ordinates are plotted on a linear scale in units of velocity of sound (meters per second). The abscissae are plotted on a logarithmic scale in units of shear modulus (dynes/cm.$^2$). The effects of muds of different weight are clearly shown.

For example, curve (A) of Fig. 4 illustrates variations in the velocity as a function of the shear modulus of the formations adjacent a water filled bore hole. Curves (B), (C) and (D) are curves for conventional drilling muds of different characteristic properties. The following is a tabulation of the characteristics of the fluids used for obtaining the four curves:

| Curve | Liquid | $k_0$(dynes/cm.$^2$) | $v_0$(meters/second) |
|---|---|---|---|
| A | water | $2.2 \times 10^{10}$ | 1,483 |
| B | 11#/gal. mud | $2.75 \times 10^{10}$ | 1,444 |
| C | 14#/gal. mud | $2.75 \times 10^{10}$ | 1,280 |
| D | 17#/gal. mud | $2.75 \times 10^{10}$ | 1,161 |

It will be noted that the variations between curves (A) and (B) are dependent not only upon a difference in velocity $v_0$ but also in a difference between the bulk modulus $k_0$. The variations between curves (B), (C) and (D) depend only upon the variations in velocity $v_0$ since the bulk modulus is known to be about the same for the three muds. The velocity $v_0$ differs for the different muds because of their different weights.

It will further be noted that measured values of the shear modulus of chalk formations in situ (for example Eagle Ford shale, characteristic of many areas in the Southwestern United States) fall at the lower portion of the curves of Fig. 4, the value being approximately $5 \times 10^9$ dynes/cm.$^2$. In chalks (such as the Austin chalk) the shear modulus falls near the upper portion of the curve, the value being approximately $5 \times 10^{10}$ dynes/cm.$^2$. The foregoing indicates that a log of this type will be extremely useful in delineating earth formations. The shear modulus of one formation as compared to another will, on a log obtained as above indicated, produce in bold relief a marker indicative of the interface between such formations.

The transmitter 11 may be of any type suitable for generating low frequency sinusoidal pressure waves in the bore hole fluid. An electromechanically driven diaphragm may be found to be suitable. If operated under high pressures it will be found desirable, as understood by those skilled in the art, to equalize the pressure on both sides of the diaphragm in order to prevent its collapse. A suitable transmitting structure embodying pressure equalization is shown in Fig. 4 of Patent 2,425,868 to Dillon. Piezoelectric crystals such as there illustrated are also suitable. A pump, driven at a relatively high speed to produce sinusoidal pressure variations in the bore hole fluid, may also be used. The detectors 25 and 26, piezoelectric devices such as shown in Fig. 3 or an equivalent, preferably are physically small as to minimize any distortion of the path between the transmitter 11 and the reflecting surface 22.

The end member 20 eliminates the effect of variations in the dimensions of the bore hole which otherwise present secondary reflecting faces along the bore hole which produce reflections to set up standing waves. In the absence of the primary reflecting face 22, secondary reflections due to bore hole variations would distort the velocity measurements as sensed by the detectors 25 and 26. The end member 20 with its reflecting face 22 reflects energy of magnitude high compared to any reflections due to variations in bore hole diameter so that the velocity measurements are substantially independent of the latter reflections.

Amplifiers and shaping devices for producing pulses at the beginning of each cycle of voltages generated by detectors 25 and 26 are well known in the art and will not be described in detail here. However, the pulse interval circuit 31 may be of the type disclosed in copending application Serial No. 192,750, filed October 28, 1950, now United States Patent 2,704,364, for Velocity Well Logging, by Gerald C. Summers, a co-worker of applicant.

A system having the following parameters may be suitable:

Frequency _____ cycles__ 150
Spacing between source 11 and face 22____ meters__ 3.3
Spacing between detectors_____ do____ ½

In Fig. 5 there is illustrated a modification of the invention. Where appropriate, the same reference characters have been used as in Fig. 1. In this modification, the first element 10 housing the transmitter 11 is mechanically coupled to the lower element 20 by a thin walled tube 40. The tube 40 houses a pair of detectors 41 and 42 disposed between the end members 10 and 20. Additionally the enclosure is filled with a fluid, such as water or oil. The bulk modulus of the fluid between the transmitter and receiver may not vary regardless of variations in the bulk modulus of the bore hole fluid and variations that might be introduced because of settling of heavy mud components to the bottom of the bore hole are substantially eliminated.

The detectors 41 and 42 have associated therewith circuit completing means (shown in Fig. 7) which connect them to the channels 43 and 44, respectively. Channels 43 and 44 are terminated in a phase angle meter 45.

The alternating current source 46 connected by way of channel 46a applies a low frequency alternating current voltage to the transmitter 11 to produce sound waves in the fluid contained in the tube 40 in the same manner as explained in connection with Fig. 1. The detectors 41 and 42 produce sinusoidal output voltages dependent upon pressure variations inside the tube 40. The output voltages applied to the phase angle meter 45 are displaced in phase one from the other in dependence upon the character of the fluids and the formations surrounding the cylinder 40. The output of the phase angle meter, a voltage proportional to the phase displacement of the detector output voltages, is applied by way of channel 45a to a recorder 47 in which a chart trace 48 varies in proportion to the phase angle between the voltages on channels 43 and 44.

Figure 6:
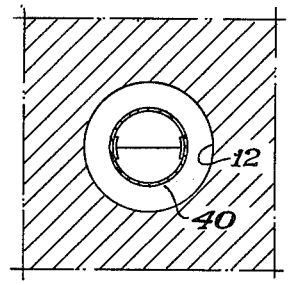
Fig. 6 is a sectional view taken along the lines 6—6 of Fig. 5.

In this system the driven fluid is restrained in tube 40. As illustrated in Fig. 6, there is an annulus of bore hole liquid or drilling mud surrounding the tube 40 which may differ in character from the liquid inside the tube 40. However as long as the dimensions of the annulus between the cylinder and the walls of the bore hole 12 are substantially constant, the voltages from detectors 41 and 42 will vary in phase in dependence only upon the shear modulus of the formations as was the case with the system of Fig. 1. However, if the dimension of the annulus varies, Equation 1 will not describe completely the variations in the velocity of sound in the fluid in the tube 40, the net result being modified slightly by such variations.

Figure 7:
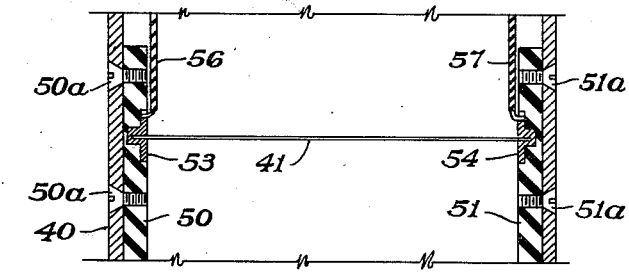
Fig. 7 is an enlarged sectional view of a detector of Figs. 5 and 6.

The detectors of Fig. 5, of the strain gauge type, may be of the construction illustrated in the detailed sectional view of Fig. 7. In accordance with Fig. 7, relatively thin strips 50 and 51 of insulating material are secured to the inner surface of the cylinder 40. The upper ends only of the strips 50 and 51 are illustrated. The strip 50 is secured in place as by screws 50a and strip 51, by screws 51a. The detector 41 is a resistance element secured at its ends in conducting inserts 53 and 54 as by soldering. The inserts 53 and 54 are secured to the strips 50 and 51 by wedging or other suitable means. The element 41 is taut as it extends diametrically across the cylinder 40. Conductors 56 and 57 are connected electrically to the inserts 53 and 54 and provide a conducting path which is connected to the channel 43 of Fig. 5. A suitable source of direct current (not shown) will be connected across conductors 56 and 57 so that variations in the diameter of the cylinder 40 as the sinusoidal pressure wave travels along its length will increase and decrease the resistance and thus the current flowing in the element 41. The resultant voltage variations are then transmitted by channel 43 to the phase angle meter 45. While the strain gauge detector is suitable for a system of this type, the pressure sensitive detector of Fig. 3 may also be used for detecting the standing wave in the tube 40 of Fig. 5.

While in Fig. 7 the strain gauge has been illustrated as a single element, it will be apparent that a plurality of such elements may be connected in parallel to increase the sensitivity of the device. The general nature of such detectors is well known by those skilled in the art and may be of the type generically disclosed in the Patent 2,548,947 to Clewell. Other types of detectors may be utilized in place of those illustrated in Figs. 3 and 7, since they are presented by way of example and not by way of limitation.

In Fig. 8 the dependence of sound velocity in the tube 40 of Fig. 5 upon hole size has been plotted. The abscissae are plotted to the same parameter as in Fig. 4. The ordinates are plotted in units of the percent of free water velocity. The curve (A) is plotted for a 4" hole; curve (B), a 5" hole; curve (C) a 6" hole; curve (D) a 7" hole; and curve (E) an 8" hole. In each case the diameter of the thin walled tube was 1.75" with a wall thickness of 1/16". It is apparent that the system is most sensitive if the annulus between tube 40 and the wall of bore hole 12 is small since in general the slope of curve (A) is steeper than that of the curves (B), (C), (D) or (E).

In the modification of the invention illustrated in Figs. 5–7, the signals from detectors 41 and 42 are applied by way of channels 43 and 44 to a phase-angle meter 45 whose output is a unidirectional voltage directly proportional to the phase angle between the signals generated by detectors 41 and 42. The phase angle is inversely proportional to the velocity of sound traveling from the transmitter 11, varying in the same manner as the time interval represented by the trace 36 of Fig. 1. In both cases trace variations will depend principally on variations in shear modulus.

A phase angle meter of the type manufactured and sold by Technology Instrument Corporation of Waltham, Massachusetts, Type 320–A, "Phase Angle Meter," has been found to be satisfactory for the meter 45. The recorders 33 and 47 may be strip chart recording poten- While modifications of the invention have been illustrated and described, it will be understood that further modifications may now suggest themselves to those skilled in the art. It is intended to cover such modifications as fall within the scope of the appended claims.

What is claimed is:

1. The method of logging variations in the shear modulus of formations adjacent a well bore which comprises generating a low frequency sinusoidal wave in a liquid in said well bore characterized by a wave length very much greater than the circumference of said well bore, at a point spaced axially along said well bore from the point of generation reflecting a portion of said wave back to said point of generation to establish a standing wave in said liquid, detecting said standing wave at two axially spaced apart points, and measuring the time-separation between the signals detected at said two points.

2. The method of logging variations in the shear modulus of formations adjacent a liquid filled well bore which comprises generating at a sending station a low frequency sinusoidal wave in said liquid characterized by a wave length very much greater than the circumference of said well bore, at a point spaced axially along said well bore from the point of generation reflecting a portion of said wave back to said sending station to establish a standing wave in said liquid, detecting said standing wave at two points spaced apart along the length of said bore hole between said sending station and said point of reflection to produce two signals which vary in accordance with variations in said standing wave, and measuring the phase angle between said two signals as a function of depth in said well bore.

3. In acoustic logging where an acoustic generator is used for generating acoustic signals in a liquid filled bore hole, the method which comprises exciting said generator with relatively low frequency sinusoidal energy to generate a sinusoidal wave in said liquid having a wave length very much greater than the circumference of said well bore, at a point a predetermined distance from said generator reflecting a portion of said wave back to said generator to produce a standing wave in said liquid, moving said generator and said reflecting point through said bore hole while maintaining said distance constant to modify the character of said standing wave proportionally with respect to variations in the shear modulus of adjacent formations, detecting said standing wave at two spaced apart points intermediate said generator and said reflecting point to produce two electrical signals which vary in accordance with variations in said standing wave, and measuring the time-separation between said electrical signals for determination of the variations in the shear modulus of the formations giving rise to the modification of said standing wave.

4. In acoustic logging where an acoustic generator is used for generating acoustic signals in a liquid filled bore hole, the method which comprises exciting said generator with relatively low frequency sinusoidal energy to generate a sinusoidal wave in said liquid having a wave length very much greater than the circumference of said well bore, at a point a predetermined distance from said generator reflecting a portion of said wave back to said generator to produce a standing wave in said liquid, moving said generator and said reflecting point through said bore hole while maintaining said distance constant to modify the character of said standing wave proportionally with respect to variations in the shear modulus of adjacent formations, detecting said standing wave at two spaced apart points intermediate said generator and said reflecting point to produce two electrical signals which vary in accordance with variations in said standing wave, and measuring the phase angle between said electrical signals for determination of the variations in the shear modulus of the formations giving rise to said modification of said standing wave.

5. A system for measuring changes in the shear modulus of formations penetrated by a liquid filled bore hole which comprises an exploring unit including a generator adapted to produce acoustic waves in said liquid and an acoustic reflector positioned in said liquid a predetermined distance from said generator, a source of low frequency sinusoidal energy for exciting said generator to produce a low frequency sinusoidal acoustic wave in said liquid characterized by a wave length very much greater than the circumference of said well bore, said wave being reflected at said reflector to produce standing waves between said reflector and said generator, means for moving said exploring unit in said bore hole past said formations to modify the character of said standing wave in dependence upon the shear modulus of said formations, means for detecting said standing wave at two points intermediate said generator and said reflector for generating two signals which vary in accordance with variations in said standing waves at said two points, and means for measuring the time-separation between said two signals.

6. A system for measuring changes in the shear modulus of formations penetrated by a liquid filled bore hole which comprises an elongated exploring unit including at one end thereof a generator adapted to produce and direct acoustic energy toward the other end, a source of low frequency sinusoidal energy for exciting said generator to produce a low frequency sinusoidal acoustic wave in said liquid characterized by a wave length very much greater than the circumference of said well bore, an acoustic reflector in said other end for reflecting said acoustic energy to produce standing waves in said exploring unit, means for moving said exploring unit in said bore hole past said formations to modify the character of said standing waves in dependence upon the shear modulus of said formations, means for detecting said standing waves at two points intermediate said generator and said reflector for generating two signals which vary in accordance with variations in said standing waves at said two points, and means for measuring the phase angle between said two signals.

7. A system for measuring changes in the shear modulus of formations penetrated by a liquid filled bore hole which comprises an elongated exploring unit including at one end thereof a generator adapted to produce and direct acoustic energy toward the other end, a source of low frequency sinusoidal energy for exciting said generator to produce a low frequency sinusoidal acoustic wave in said liquid characterized by a wave length very much greater than the circumference of said well bore, an acoustic reflector in said other end for reflecting said acoustic energy to produce standing waves in said exploring unit, a thin walled cylinder interconnecting said generator and said reflector for confining a volume of said liquid, means for moving said exploring unit in said bore hole past said formations to modify the character of said standing waves in dependence upon the shear modulus of said formations, means for detecting said standing waves at two points intermediate said generator and said reflector for generating two signals which vary in accordance with variations in said standing waves at said two points, and means for measuring the phase angle between said two signals.

8. A system for measuring changes in the shear modulus of formations penetrated by a liquid filled bore hole which comprises a sonic generator supported for movement through said bore hole, a source of low frequency alternating current connected to said generator for producing a sinusoidal acoustic wave in said liquid characterized by a wave length very much greater than the circumference of said well bore, an acoustic reflector supported in said liquid and spaced not less than about ten bore hole diameters from said generator axially along said bore hole to produce a standing wave between said reflector and said generator, means for moving said generator and reflector along the length of said bore hole past said formations to modify the character of said standing wave in dependence upon the shear modulus of said formations, two detectors supported in spaced apart relation between said generator and reflector for detecting said standing wave at two points for generating two signals which vary in accordance with variations in said standing waves at said two points, and means for measuring the time-separation between said two signals.

9. A system for measuring changes in the shear modulus of formations penetrated by a liquid filled bore hole which comprises a sonic generator supported for movement through said bore hole, a source of low frequency sinusoidal energy connected to said generator to produce a low frequency sinusoidal sound wave in said liquid characterized by a wave length very much greater than the circumference of said well bore, an acoustic reflector, means for supporting said reflector at a predetermined distance from said generator axially of said bore hole for reflecting said acoustic energy to produce standing waves in the region between said generator and said reflector, a pair of detectors supported in fixed spaced apart relation from said generator and said reflector and from each other intermediate said generator and reflector for producing two signals which vary in accordance with variations in said standing wave, and means for measuring the phase angle between said two signals.

10. A system for logging the shear modulus of formations penetrated by a liquid filled bore hole which comprises an exploring unit of diameter less than the said well bore and including in spaced sequence axially of said well bore an acoustic generator, a first detector, a second detector and an acoustic reflector with the distance between said generator and said reflector substantially greater than the circumference of said well bore, a source of sinusoidal current connected to said generator of low frequency for producing longitudinal compressional waves in said unit having a wave length long compared with said circumference which upon reflection from said acoustic reflector produce a standing wave in said unit, means for moving said unit through said bore hole to modify said standing wave in dependence upon the shear modulus, and a circuit including measuring means for measuring the time-separation between the signals from said first and second detectors produced by said standing wave.

References Cited in the file of this patent
UNITED STATES PATENTS

| | | |
|---|---|---|
| 2,191,120 | Schlicter | Feb. 20, 1940 |
| 2,233,992 | Wyckoff | Mar. 4, 1941 |
| 2,301,458 | Salvatori | Nov. 10, 1942 |
| 2,530,971 | Kean | Nov. 21, 1950 |